United States Patent
Kretschmer et al.

[11] Patent Number: 5,921,575
[45] Date of Patent: Jul. 13, 1999

[54] AIRBAG DEVICE

[75] Inventors: Jürgen Kretschmer, Esslingen; Klaus Möller; Reinhard Schmale, both of Wuppertal, all of Germany

[73] Assignee: Becker Group Europe GmbH, Wuppertal, Germany

[21] Appl. No.: 08/951,352

[22] Filed: Oct. 16, 1997

[30] Foreign Application Priority Data

Oct. 18, 1996 [DE] Germany ............... 196 42 964

[51] Int. Cl.$^6$ ................................. B60R 21/22
[52] U.S. Cl. ..................... 280/728.2; 280/730.2
[58] Field of Search ............... 280/728.2, 730.1, 280/730.2, 749

[56] References Cited

U.S. PATENT DOCUMENTS

| | | | |
|---|---|---|---|
| 5,468,012 | 11/1995 | Mihm | 280/728.2 |
| 5,540,459 | 7/1996 | Daniel | 280/730.2 |
| 5,755,457 | 5/1998 | Specht | 280/730.2 |
| 5,775,726 | 7/1998 | Timothy et al. | 280/730.1 |
| 5,788,270 | 8/1998 | Haland et al. | 280/730.2 |
| 5,791,683 | 8/1998 | Shibata et al. | 280/730.2 |

FOREIGN PATENT DOCUMENTS

| | | |
|---|---|---|
| 0 694 444 | 1/1996 | European Pat. Off. . |
| 19 25 131 | 11/1969 | Germany . |
| 20 14 048 | 10/1971 | Germany . |
| 21 63 918 | 7/1972 | Germany . |
| 2 339 610 | 2/1974 | Germany . |
| 2 302 648 | 7/1974 | Germany . |
| 44 26 848 | 2/1996 | Germany . |
| 296 03 316 U | 8/1996 | Germany . |
| 296 05 896 U | 9/1996 | Germany . |
| 296 10 920 U | 10/1996 | Germany . |
| 296 13 781 U | 11/1996 | Germany . |

OTHER PUBLICATIONS

German Patent Office, Search Report, Feb. 6, 1997, for foreign counterpart application DE 196 42 964.1.

*Primary Examiner*—Paul N. Dickson
*Attorney, Agent, or Firm*—Harness, Dickey & Pierce, P.L.C.

[57] ABSTRACT

An airbag device for a vehicle is described, which has an airbag consisting of an inflatable gas cushion, a gas generator for filling the airbag, a gas conduction pipe which extends through a separated region of the airbag, outlet openings in the gas conduction pipe, a profile strip with a shooting channel formed therein, in which the airbag laid in stacked folds is received in addition to the gas conduction pipe and attachment elements for holding the construction unit comprising the profile strip, airbag and gas conduction pipe.

19 Claims, 3 Drawing Sheets

AIRBAG DEVICE

BACKGROUND OF THE INVENTION

The invention relates to an airbag device for a motor vehicle.

A wide variety of designs of airbag devices have been disclosed and they offer effective protection of a vehicle occupant in the event of a traffic accident.

SUMMARY OF THE INVENTION

The invention is based on the object of providing a preassembled, modular, active head protection (airbag) system for motor vehicles.

To achieve this object, the invention proposes an airbag device for a motor vehicle, having an airbag which consists of an inflatable gas cushion, a gas generator for filling the airbag, a gas conduction pipe which extends through a separated region of the airbag, outlet openings in the gas conduction pipe, a profile strip with a shooting channel formed therein, in which the airbag laid in stacked folds is received in addition to the gas conduction pipe, and attachment elements for holding the construction unit comprising the profile strip, airbag and gas conduction pipe.

The profile strip with the airbag and gas conduction pipe can advantageously extend in each case along one side of the vehicle from the A-pillar to the C-pillar and be arranged on the vehicle body in the transition region from the vehicle roof and one side wall of the vehicle.

The profile strip which receives the gas conduction pipe and the airbag within the shooting channel may be a component which is simple in terms of production and, in particular, is also cost-effective, and it preferably has an essentially U-shaped cross-section with two limbs and a bar which connects them together. In this case, the bar is expediently adapted to the shape of the gas conduction pipe which is supported thereon.

The profile strip may be made as an extruded or injection-molded plastic part, and it preferably consists of a thermoplastic, such as PP, PP-EPDM, TPE or PVC.

A particularly expedient further development of the invention consists in the fact that the profile strip is reinforced by an incorporated structure band consisting of metal, such as steel or aluminum. The airbag device can thus be used throughout the entire temperature range (−40° C.−+120° C.) required by users, since the mechanical properties are essentially determined by the metal structure band.

A further refinement of the invention provides for the limbs of the profile strip to diverge before the airbag and gas conduction pipe are introduced into the profile opening forming the shooting channel, and for the limbs of the profile strip to be aligned approximately parallel to one another after the airbag and gas conduction pipe have been introduced. The initially diverging limbs make assembly easier, that is to say mainly the introduction of the gas conduction pipe and the airbag into the shooting channel, and can be moved without difficulty into the desired alignment, such as a parallel position, by means of simple auxiliary equipment belonging to the prior art.

Particular advantages of the invention can be seen in the fact that the unfolding direction of the airbag is defined by the shooting channel, that there is linear support of the airbag during the unfolding operation and thus uniform unfolding, and that the installation site of the profile strip is freely selectable, since the natural rigidity of the airbag device can be varied within broad limits by the choice of material and the material combination for the profile strip.

Furthermore, the restraint, i.e. the resistance that the airbag has to overcome during unfolding, can be varied within broad limits, specifically by the structure band incorporated in the profile strip, by the angle between the flanks (profile limbs) and furthermore by the fact that the profile strip has means for closing the profile opening or the shooting channel. For this purpose, provision may be made for the profile strip to have a continuous closure lip, on the opening side, which may, in particular, also have a continuous tear-open seam formed, for example, by a perforation. The closure lip is advantageously formed on along an edge at a free end of the limb of the profile strip and, with the other edge, forms a joint with the second limb of the profile strip, in which case the joint may be a clip, welded, bonded or sewn joint.

Restraint of the airbag can also be achieved in that a shrink tube is arranged around the gas conduction pipe and the folded airbag, which tube has a defined tear-open seam which coincides with the orifice of the shooting channel.

A further expedient refinement of the invention provides for the limbs of the profile strip to have beads or the like which can be overcome by the gas conduction pipe during assembly to secure the gas conduction pipe in its position.

The gas conduction pipe and the profile strip should have a configuration which follows the contour of the body, which can be realized by the gas conduction pipe and, if appropriate, also the profile strip being designed in a curve, such as an elongated curve. During the bending of the profile strip, attention must be paid to the fact that its opening cross-section remains unchanged over the total axial extent.

The fastening elements for the airbag device expediently comprise simple clips which can be preassembled on the profile strip or on the body, are arranged adjacently in rows, and should be made of plastic or preferably of metal, such as spring plate.

It is important for the folded airbag to have a band securement which defines the span line for the unfolded airbag.

An exemplary embodiment of the invention is explained in greater detail below with reference to the drawings.

DETAILED DESCRIPTION OF THE PREFERRED EMBODIMENTS

Figure 1:
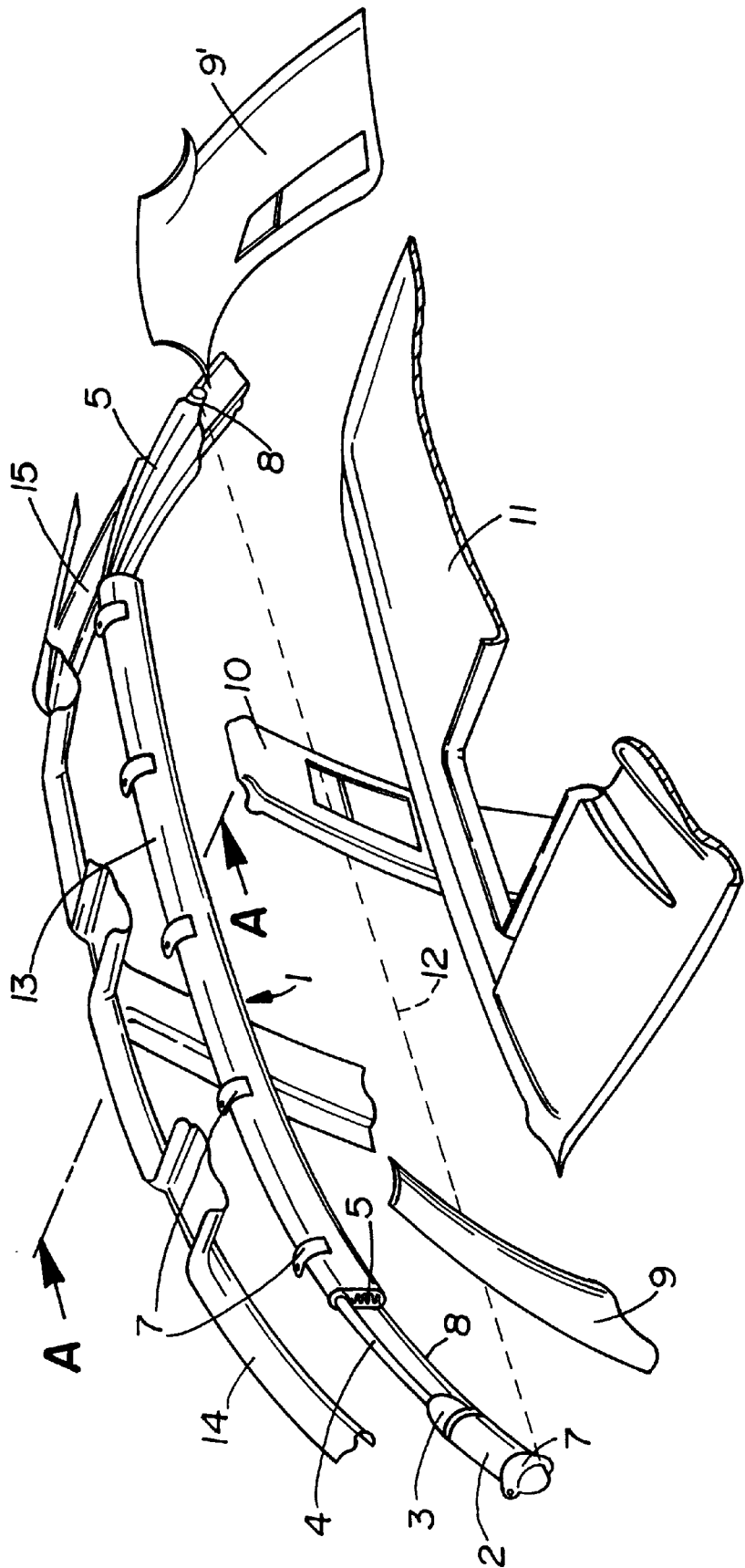
FIG. 1 depicts an exploded perspective view of an airbag device with a vehicle body.
Figure 2:
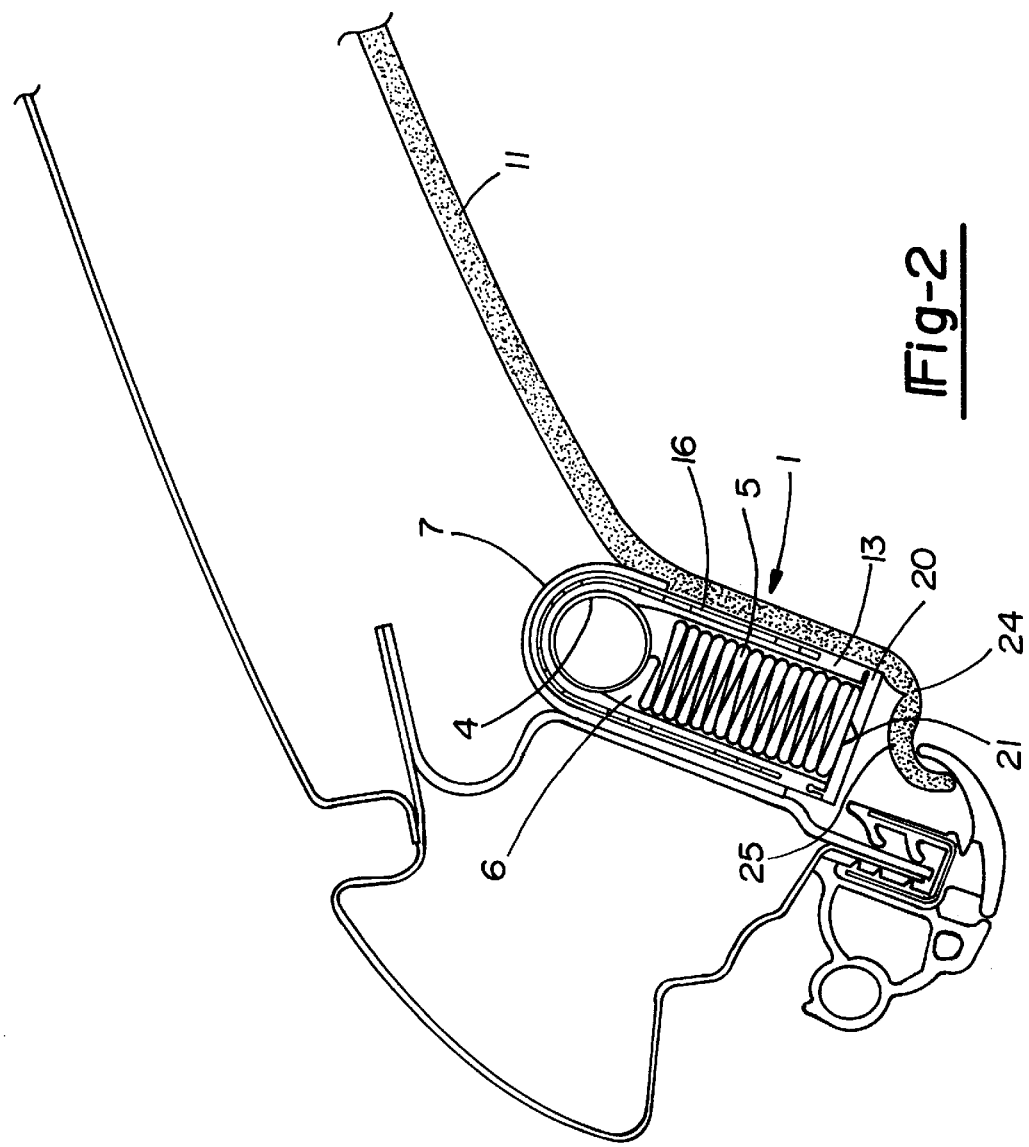
FIG. 2 depicts a cross-sectional view of the air bag device and vehicle body following the line A—A in FIG. 1.

Referring now to the Figures, the novel airbag device is a head protection module which is denoted by the reference numeral 1 and is to be arranged in the transition region from the vehicle roof to each side wall of the vehicle in a manner which can be seen in FIGS. 1 and 2. The head protection module comprises a gas generator 2, an adaptor 3 to produce a connection between the gas generator 2 and a gas conduction pipe 4, a folded airbag 5 and a profile strip 13 made with a shooting channel 6. The airbag device extends from the A-pillar 14 (instrument panel region) up to the C-pillar 15 and is adapted to the course of the body. The airbag device is to be attached to the vehicle body by means of clips 7, in which case the clips 7, which may be made of spring plate, can be preassembled on the body or on the airbag device. Holding/spanning bands 8 define a span line 12.

For reasons of completeness, FIG. 1 illustrates a modified pillar cladding 9 for the A-pillar 14, a modified pillar cladding 9 for the C-pillar, a B-pillar cladding 10 and a shaped roof 11.

Figure 3:
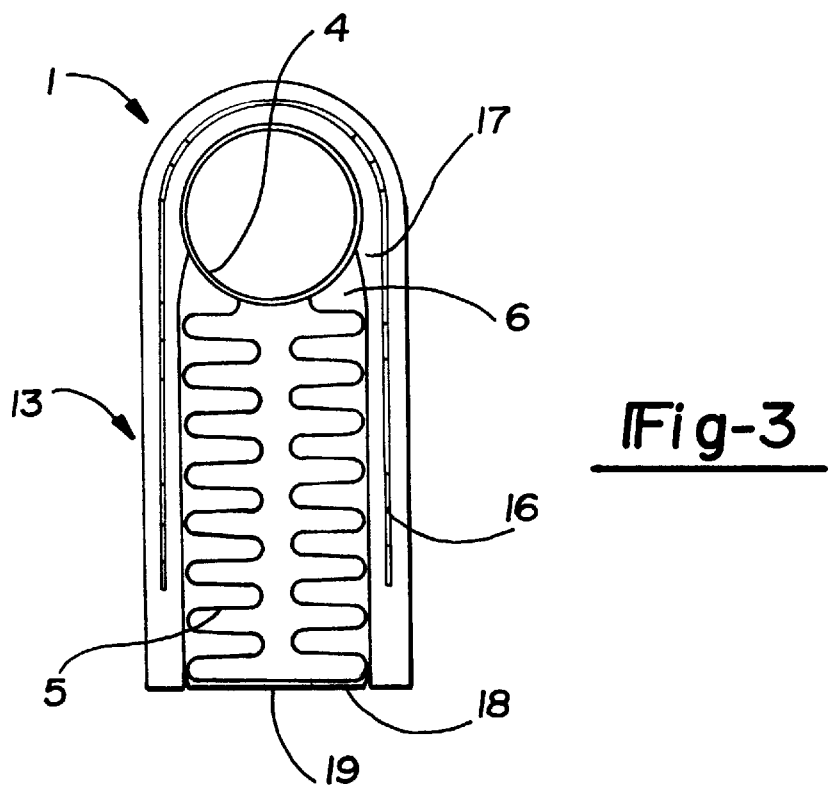
FIG. 3 depicts a cross-sectional view through the airbag device according to a first embodiment.

FIG. 3 shows a cross-section of the airbag device and demonstrates that the shooting channel 6 is made in a profile strip 13 which has a U-shaped cross-section with two limbs and a bar which connects them together. The profile strip expediently consists of a thermoplastic material and is made by injection-molding or extrusion methods. An incorporated structure band 16 gives the profile strip 13 sufficient rigidity to meet the technical requirements. The gas conduction pipe 4 and the airbag 5 stacked in folds are received inside the shooting channel 6. The gas conduction pipe 4 is seated in a separate region of the airbag which may be formed by sewing. Outlet openings (not shown) in the gas conduction pipe 4 are directed towards the folded airbag in order to unfold it or rapidly inflate it when it is required.

Inside the shooting channel 6, the limbs of the profile strip 13 have beads 17 which narrow the shooting channel 6. The beads 17 can easily be overcome by the gas conduction pipe 4 when the latter is introduced, but they then secure its position inside the shooting channel 6.

In the exemplary embodiment according to FIG. 3, the shooting channel 6 is designed to be open. In contrast, the airbag 5 laid in folds is enclosed by a shrink tube 18 which has a tear-open seam 19 in the region of the orifice of the shooting channel. The tear-open seam 19 is designed in such a way that it opens at a specific pressure of the filling gas, and the airbag 5 can unfold into the vehicle interior.

Figure 4:
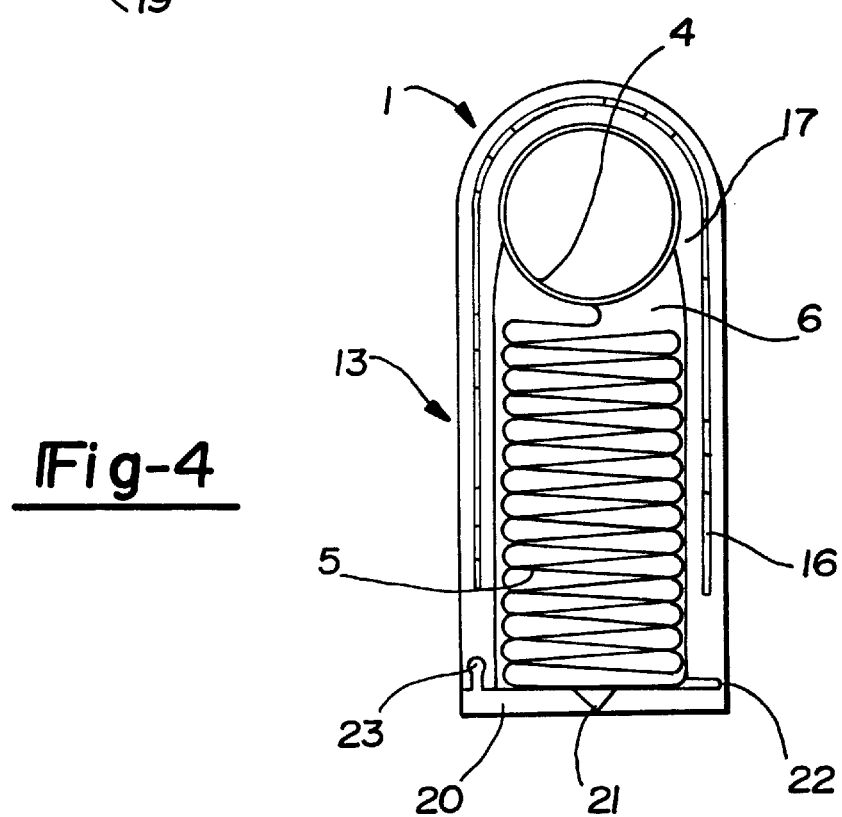
FIG. 4 depicts a cross-sectional view through the airbag device according to a second embodiment.

In the exemplary embodiment according to FIG. 4, the difference compared to that of FIG. 3 consists essentially in the fact that the shooting channel 6 is closed by a closure lip 20, and the airbag 5 is not surrounded by a shrink tube 18. In this case, the closure lip 20 thus exerts a restraining effect on the filling gas generated. At a specific pressure of the filling gas, the closure lip 20 can open, for example along a tear-open seam 21 formed therein.

The closure lip 20 may be formed at an edge at a free end 22 of one limb on the profile strip 13, e.g. in the manner of a film hinge, and at an edge at a free end 23 of the other limb form a joint, e.g. a clip joint, with the profile strip 13. This joint may be a clip, welded, bonded or sewn.

FIG. 2 illustrates the arrangement of the novel airbag device in a vehicle and the alignment of the shooting channel 6 which permits the airbag to unfold into a position which provides a head protection for a vehicle occupant. In the intended and illustrated airbag device, the inflated airbag comes into effect between the head of a vehicle occupant and the side window of a vehicle which is adjacent to him/her, so that the head of the vehicle occupant cannot impact either against the side window or against hard regions of the frame of the body.

As shown in FIG. 2, the airbag device can be covered by the shaped roof 11, an intended bending point 24 in the shaped roof 11 ensuring that an edge region 25 instantly exposes the shooting channel 6 when the airbag unfolds.

A sequence of assembly is explained briefly below.

EXAMPLE 1

Produce the airbag by sewing a cushion with a sewn section to provide an insertion tunnel for the gas filling pipe.

Fold the airbag in an extended position.

Secure the folds with shrink tubing, in which case the film is to be provided with a tear-open seam.

Bend the gas conduction pipe according to the contour/body (elongated bending) and punch out outlet openings (preferably) in the bending device.

Insert the bent gas conduction pipe into the airbag/shrink tube unit.

Produce an infinitely extruded profile strip, cut it to the desired length and, if necessary, bend it to the contour of the body (elongated bending).

Introduce the preassembled unit (gas conduction pipe, airbag, shrink tube) into the shooting channel of the profile strip and position undercuts around the gas conduction pipe by a rolling operation, simultaneously aligning the profile limbs as required.

Attach the gas generator to the gas conduction pipe using the adaptor.

Insert the module into clamping clips (on the body).

Fix and secure the module to the gas generator fastening and to the projecting gas conduction pipe on the body using screws.

EXAMPLE 2

Produce the airbag by sewing a cushion with a sewn section to provide an insertion tunnel for the gas filling pipe.

Fold the airbag in an extended position.

Secure the folds at some points using bands.

Bend the gas conduction pipe according to the contour/body (elongated bending) and punch out outlet openings (preferably) in the bending device.

Insert the bent gas conduction pipe into the airbag/band securement.

Produce an infinitely extruded profile strip with a closure lip, cut it to the desired length and, if necessary, bend it to the contour of the body (elongated bending).

Introduce the preassembled unit (gas conduction pipe, airbag) into the shooting channel of the profile strip and position undercuts around the gas conduction pipe by a rolling operation, with simultaneous rolled alignment of the profile limbs.

Clip the closure lip into the undercut.

Attach the gas generator to the gas conduction pipe using the adaptor.

Insert the module into clamping clips (on the body).

Fix and secure the module to the gas generator fastening and to the projecting gas conduction pipe on the body using screws.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. An airbag device in a motor vehicle, the motor vehicle including a body having two side walls, a roof, and an A-pillar and a C-pillar extending to the roof, said airbag device comprising:

an airbag consisting of an inflatable gas cushion;

a gas generator for filling the airbag;

a gas conduction pipe which extends through a separated region of the airbag;

at least one outlet opening in the gas conduction pipe;

a profile strip, reinforced by an incorporated structure band, having a substantially U-shaped cross-section and with a shooting channel formed therein, in which the airbag is laid in stacked folds and is received, and in which the gas conduction pipe is received, wherein the profile strip with the airbag and gas conduction pipe extends along one side of the vehicle from the A-pillar to the C-pillar and is arranged on the vehicle body in a transition region from the vehicle roof and one side wall of the vehicle; and a plurality of attachment elements for holding a construction unit comprising the profile strip, airbag and gas conduction pipe.

2. The airbag device according to claim 1, wherein the profile strip has two limbs and a bar connected to the limbs.

3. The airbag device according to claim 2, wherein the bar is adapted to the shape of the gas conduction pipe supported thereon.

4. The airbag device according to claim 1, wherein the profile strip is made as an extruded or injection-molded plastic part.

5. The airbag device according to claim 1, wherein the profile strip is made from a thermoplastic.

6. The airbag device according to claim 5, wherein the thermoplastic is selected from a group consisting of PP, PP-EPDM, TPE and PVC.

7. The airbag device according to claim 1, wherein the structure band is made of metal.

8. The airbag device according to claim 1, wherein the profile strip has limbs that diverge before the airbag and gas conduction pipe are introduced into the profile opening forming the shooting channel, and the limbs of the profile strip are aligned approximately parallel to one another after the airbag and gas conduction pipe have been introduced.

9. The airbag device according to claim 1, wherein the profile strip has means for closing one of the following:

a profile opening; and the shooting channel.

10. The airbag device according to claim 1, wherein the profile strip has a continuous closure lip on an opening side.

11. The airbag device according to claim 10, wherein the closure lip has a continuous tear-open seam.

12. The airbag device according to claim 10, wherein the closure lip is formed on an edge at a free end of a limb of the profile strip and, with another edge forms a joint with a second limb of the profile strip.

13. The airbag device according to claim 1, wherein a shrink tube is arranged around the gas conduction pipe and the folded airbag, which tube has a defined tear-open seam positioned in an orifice of the shooting channel.

14. The airbag device according to claim 1, wherein the profile strip includes limbs that have beads which can be overcome by the gas conduction pipe during assembly to secure the gas conduction pipe in its position.

15. The airbag device according to claim 1, wherein the gas conduction pipe and the profile strip have a configuration which follows the contour of the body of vehicle.

16. The airbag device according to claim 15, wherein the gas conduction pipe is curved.

17. The airbag device according to claim 16, wherein the profile strip is curved.

18. The airbag device according to claim 1, wherein the attachment elements comprise clips preassembled and arranged adjacently in a row on one of the following:

the profile strip; and the vehicle body.

19. The airbag device according to claim 1, further comprising a band securement which defines a span line when the airbag is unfolded.

* * * * *